United States Patent [19]

Suzuki

[11] Patent Number: 5,444,832
[45] Date of Patent: Aug. 22, 1995

[54] PIXEL DENSITY CONVERTER

[75] Inventor: Masato Suzuki, Iwatsuki, Japan

[73] Assignee: Fuji Xerox Co., Ltd., Tokyo, Japan

[21] Appl. No.: 215,973

[22] Filed: Mar. 18, 1994

Related U.S. Application Data

[63] Continuation of Ser. No. 10,472, Jan. 28, 1992, abandoned, which is a continuation of Ser. No. 588,139, Sep. 26, 1990, abandoned.

[30] Foreign Application Priority Data

Jan. 31, 1990 [JP] Japan .................................. 2-19105

[51] Int. Cl.$^6$ ............................................. G06F 15/62
[52] U.S. Cl. ..................................... 395/132; 395/129
[58] Field of Search ............... 395/127, 131, 139, 132; 348/27

[56] References Cited

U.S. PATENT DOCUMENTS

| | | | |
|---|---|---|---|
| 4,682,243 | 7/1987 | Hatayama | 358/451 |
| 4,712,141 | 12/1987 | Tomohisa et al. | 358/448 |
| 4,941,194 | 7/1990 | Shiomura | 382/56 |
| 5,086,489 | 2/1992 | Shimura | 382/56 |

*Primary Examiner*—Mark R. Powell
*Assistant Examiner*—Huynh Ba
*Attorney, Agent, or Firm*—Finnegan, Henderson, Farabow, Garrett & Dunner

[57] ABSTRACT

Each one of three different, separate pixel density converters, which are alternative embodiments, operates upon an electrical signal representing successive pixels of an image. The first pixel density signal converter repeats an integration process by adding together multi-valued data representing intensity levels of two adjacent pixels, dividing by two, then repeating for such already integrated pixels to integrate a fixed number of pixels into one pixel, converting the result to a binary signal, the conversion comprising comparing the represented pixel intensity value to a fixed threshold value, and then transmitting a succession of such signals representing a plurality of adjacent data-reduced pixels. The second pixel density converter achieves comparable data reduction in a transmitted signal upon a basis of adding together a fixed number of pixels, more than two, dividing by the fixed number and performing a similar binary conversion. The third pixel density converter is similar to the second except that the fixed number is changed to satisfy the condition that the total of such numbers in a given sequence reaches a required value, the binary conversion successively yielding values upon which a resultant data-reduced signal is based, with the result that an image reproduced from the resultant signal will have reduced moire effect, which can be caused by interference between its pixels.

1 Claim, 9 Drawing Sheets

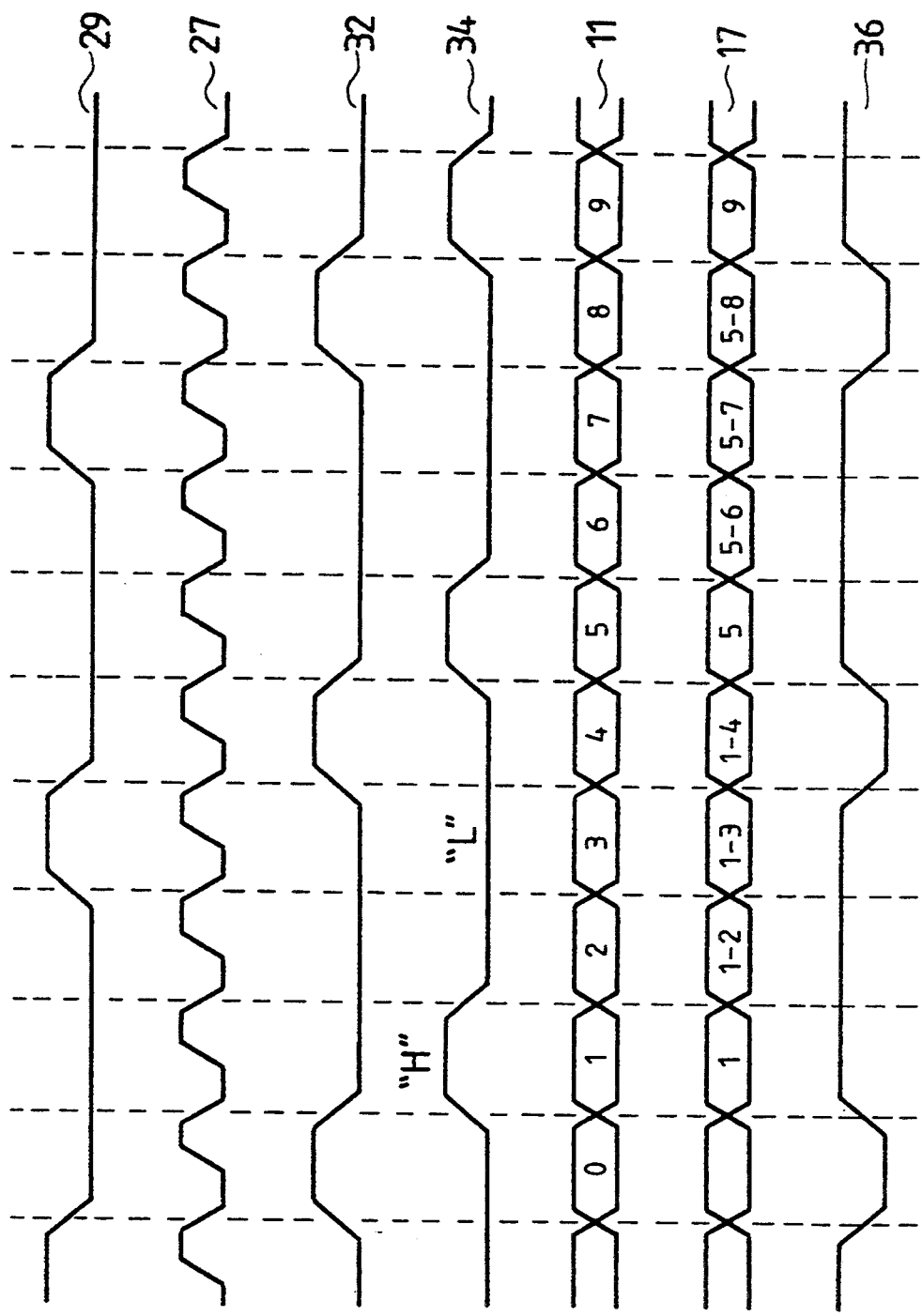

PIXEL DENSITY CONVERTER

This application is a continuation of application Ser. No. 08/010,472, filed Jan. 28, 1993, which is a continuation of application Ser. No. 07/588,139, filed Sep. 26, 1990, both now abandoned.

BACKGROUND OF THE INVENTION

The present invention concerns a pixel density converter which converts the density of pixels in image data formed by a computer reading with an image sensor. In particular, it relates to a pixel density converter whereby the intensity level of each pixel, based on image data expressed in multi-valued notation, is expressed in binary notation, while the number of pixels is reduced.

In the case of a facsimile machine, for example, when the size of the print-out paper at the receiving end is smaller than the image record at the transmitting end, the image data are reduced before transmission. Or, when certain image information undergoes image editing whereby it is inserted into a prescribed image area, this image information undergoes appropriate reduction. Similarly, photocopiers which copy image information read by an image sensor at a specified rate of magnification often employ image data reduction.

FIG. 13 shows an example of one conventional principle of pixel density conversion. The example shown in FIG. 13 illustrates a case of a linear reduction to 25 percent. In this case, of the pixel series A,B,C, etc. shown in part (a) of the diagram, one in every four pixels is extracted and the remaining ones discarded, forming the pixel row shown in part (b) of the diagram. In this example, pixels A,E,I, etc. are extracted, while pixels B,C,D,F,G, etc. are discarded. When the respective intensity levels of the extracted pixels A,E,I, etc. are expressed in multi-valued notation, these are then converted to binary notation using a fixed threshold value, and binary encoded image data are produced, as shown in part (c) of the diagram.

FIG. 14 shows an example of another conventionally used principle of pixel density conversion. This example similarly shows a case of reduction to 25 percent. The pixel series A,B,C, etc., shown in part (a) of FIG. 14 is converted to binary notation, and binary encoded image data are produced, as shown for example in part (b). These image data are in turn assembled in groups of four pixels each and a logic total is taken for each group. In this way, binary encoded image data are produced following reduction, as shown in part (c) of the diagram.

While the process of a pixel density converter using the principle shown in FIG. 13 is straightforward since it involves a simple thinning-out of the image data, there have been problems of considerable deterioration of image information due to pixel disappearance. For example, in this case there has been the possibility that lines and points with a breadth of less than 4 pixels could be lost.

In contrast, with a pixel density converter using the principle shown in FIG. 14, a logic total of the image data is taken in order to prevent disappearance of the image information. Nevertheless, since the logic total is taken after conversion from multi-valued to binary notation, the condition of the original image data is insufficiently preserved and image degradation, etc., occurs; thus, no effective improvement has been achieved against deterioration of image information.

In addition, another problem with conventional pixel density converters has been that image processing has required a considerable amount of time, since it has been normal for logic processes, such as totaling, to be undertaken via software.

SUMMARY OF THE INVENTION

Thus, the first objective of the present invention is to produce a pixel density converter that can effect a reduction in the number of multi-valued image data pixels and their conversion to binary notation, while reducing influences on image quality to a minimum.

The second objective of the present invention is to produce a pixel density converter that can carry out pixel density conversion at high speed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

In accordance with the invention, a pixel density converter is equipped with:

a means for pixel integration whereby multi-valued data representing the respective intensity levels of two adjacent pixels are added together then divided by two, giving the intensity level of a single integrated pixel;

a means for integration control whereby the integration process of the means for pixel integration is successively repeated, and a successive fixed number of pixels is finally integrated into one pixel;

and a means for binary conversion whereby the respective intensity level of each pixel finally integrated in accordance with the above means for integration control is converted to binary notation using a fixed threshold value, and output is made in the form of a row of pixels following a reduction in the number of pixels.

BRIEF DESCRIPTION OF THE DRAWINGS

The accompanying drawings, which are incorporated in and constitute a part of the specification, illustrate the presently preferred apparatus and method of the invention and, together with the general description given above and the detailed description of the preferred embodiment given below, serve to explain the principles of the invention. Of the drawings:

FIGS. 5(a)–5(g) are timing diagrams showing the timings of all parts of the device of this example;

DETAILED DESCRIPTION

Figure 1A:
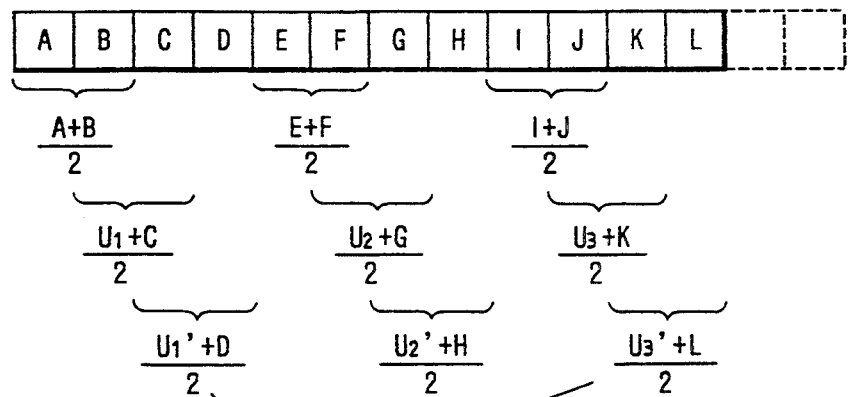
FIGS. 1(a)–1(c) are theoretical diagrams showing a principle used in the invention.
Figure 1B:
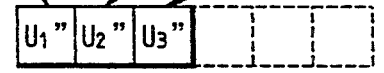
Figure 1C:
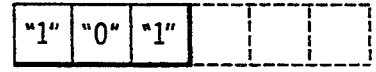

FIGS. 1(a)-1(c) take as an example a case of linear reduction to 25 percent to explain a broader principle. The pixel series A,B,C, etc. shown in part (a) of the diagram is divided into groups of 4 pixels each, then, of these, the average intensity level of the first and second pixels is determined, this value representing the intensity level of the pixel integrated from these two pixels. Next, the average value of this integrated pixel and the next pixel is determined, giving the intensity level of the pixel integrated from these. Following on similarly, pixel integration is carried out through to the last pixel of each group, until the final pixels $U_1''$, $U_2''$, $U_3''$, etc. are produced as shown in part (b) of the diagram.

For example, to make a specific illustration from the first group, the first pixel A is added to the next pixel B, and the average value $U_1$ is first produced by division by 2 as follows:

$$U_1 = \frac{A + B}{2}$$

Next, the average value $U_1'$ is determined from this value $U_1$ and the next pixel C.

$$U_1' = \frac{U_1 + C}{2}$$

Following on similarly, the average value $U_1''$ is determined from this value $U_1'$ and the next pixel C.

$$U_1'' = \frac{U_1' + D}{2}$$

When the final pixels $U_1''$, $U_2''$, $U_3''$, etc. have been determined as shown in part (b) of the diagram, these are then converted to binary notation using a fixed threshold value, to produce binary encoded image data following reduction, as shown in FIG. 1(c).

In a modified embodiment of the invention, a pixel density converter is equipped with:

a means for pixel integration whereby multi-valued data representing the respective intensity levels of a successive fixed number of pixels are added together then divided by the same fixed number, giving the intensity level of a single integrated pixel;

and a means for binary conversion whereby the respective intensity levels of pixels produced as a result of successive integration in accordance with the above means for pixel integration are converted to binary notation using a fixed threshold value, and output is made in the form of a row of pixels following a reduction in the number of pixels.

Figure 2A:
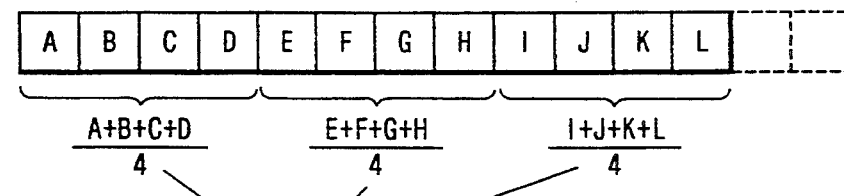
FIGS. 2(a)–2(c) are theoretical diagrams showing another principle used in the invention.
Figure 2B:
Figure 2C:
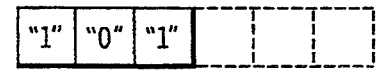

FIGS. 2(a)-2(c) explain the principle of the modified embodiment. This diagram also takes as an example a case of linear reduction to 25 percent. The pixel series A,B,C, etc. shown in part (a) of the diagram is divided into groups of 4 pixels each, and the averages of all pixels within these groups are determined. These become the intensity levels of the integrated pixels $U_1$, $U_2$, $U_3$, etc. For example, to make a specific illustration from the first group, the average value $U_1$ is produced as follows.

$$U_1 = \frac{A + B + C + D}{4}$$

Here, the numerical value of the denominator, "4", is identical to the total number of pixels in the group. Having thus produced pixels $U_1$, $U_2$, $U_3$, etc. after integration, as shown in part (b) of the diagram, these are then converted to binary notation using a fixed threshold value, producing the binary encoded image data following reduction as shown in FIG. 2(c).

In another modified embodiment of the invention, a pixel density converter is equipped with:

a means for pixel integration whereby multi-valued data representing the respective intensity levels of a successive fixed number of pixels are added together then divided by the same fixed number, giving the intensity level of a single integrated pixel;

a means for specifying a fixed number whereby, whenever pixel integration occurs in accordance with the above means for pixel integration, the aforementioned fixed number changes individually such that the total of numbers in a given sequence reaches a required value;

and a means for binary conversion whereby the respective intensity levels of pixels integration are converted to binary notation using a fixed threshold value, and output is made in the form of a row of pixels following a reduction in the number of pixels.

Figure 3A:
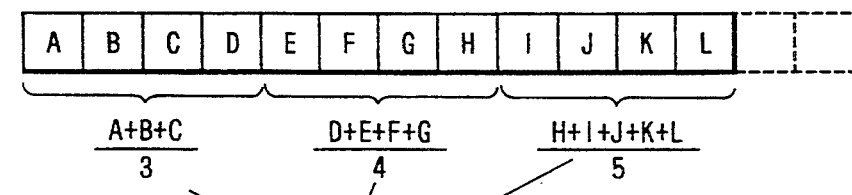
FIGS. 3(a)–3(c) are theoretical diagrams showing still another principle used in the invention.
Figure 3B:
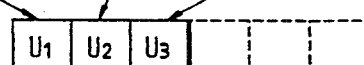
Figure 3C:
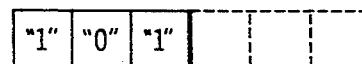

FIGS. 3(a)-3(c) explain the principle of this modification. This diagram also takes as an example a case of linear reduction to 25 percent. In this invention, in order to create 3 final pixels from 12 pixels, the pixels are randomly divided into groups of 3, 4, and 5, and from each of these groups one pixel is created. This sort of division into groups can be implemented by marking off each serially transmitted pixel by a random pulse generated under fixed conditions such as the rate of reduction, etc.

Having made group divisions in this way, the average intensity levels of pixels in the respective groups are determined as shown in FIG. 3(a), and these become the intensity levels of integrated pixels $U_1$, $U_2$, $U_3$, etc. For example, to make a specific illustration from the first group, the average value $U_1$ is produced as follows.

$$U_1 = \frac{A + B + C}{3}$$

Here, the numerical value of the denominator, "3", is identical to the total number of pixels in the group. Since the total number of pixels in the group changes at random, the numerical value of the denominator also changes accordingly. Having thus produced the pixels $U_1$, $U_2$, $U_3$, etc. after integration, as shown in FIG. 3(b), these are then converted to binary notation using a fixed threshold value, to produce binary encoded image data following reduction, as shown in FIG. 3(c).

Now the present invention shall be explained in detail, with reference to examples of implementation.

1st Example of Implementation

Figure 4:
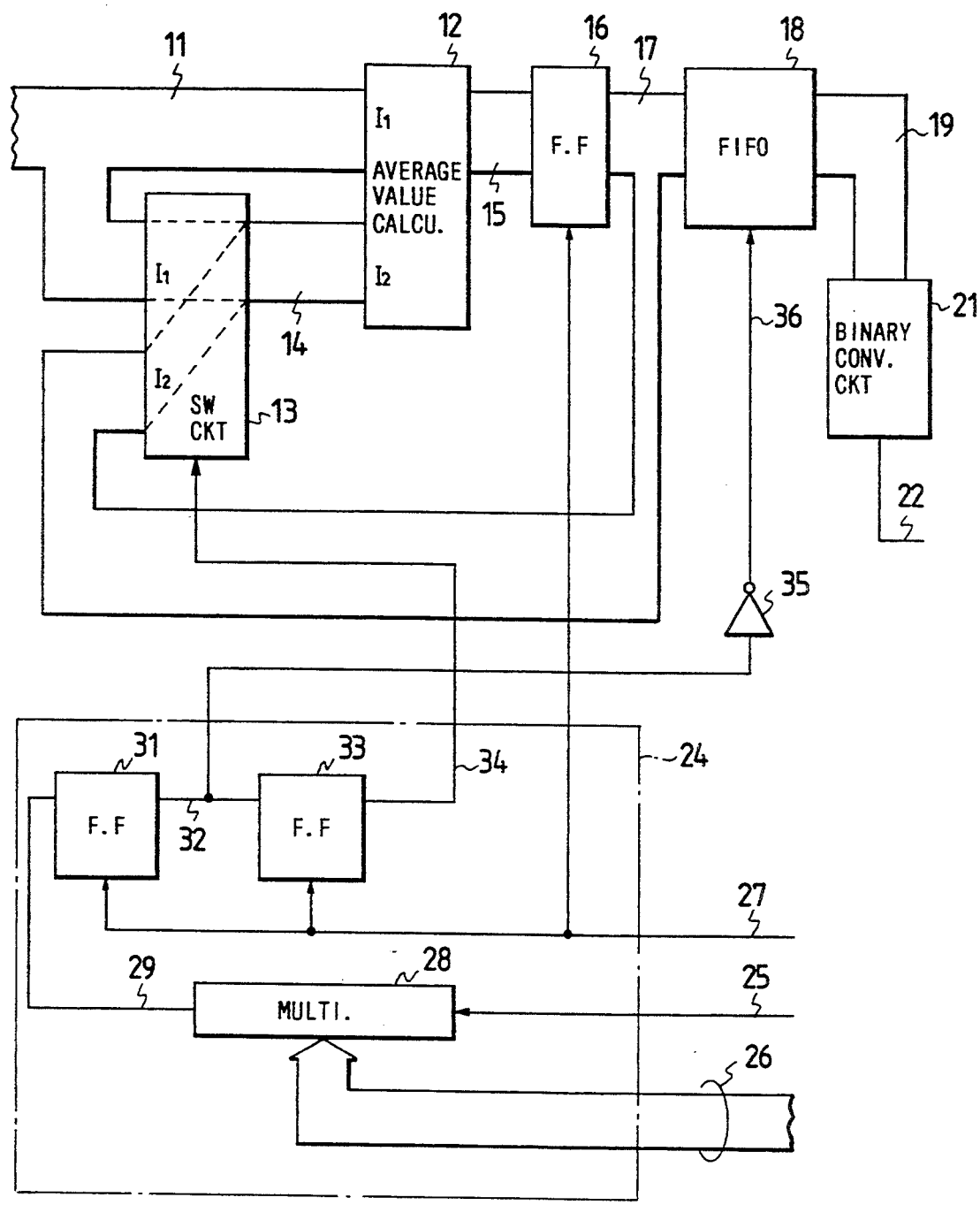
FIG. 4 is a block diagram showing the main features of the circuit structure of a pixel density converter according to a first example of implementation of the invention.

FIG. 4 shows the structure of the pixel density converter used in the first example of implementation of the present invention. This example of implementation embodies the invention according to the first above-described principle. In the device shown in FIG. 4, after A/D conversion from the reading device (not shown) and shading correction, multi-valued image data 11 are fed in one-pixel segments. These multi-valued image data 11 are fed into input $I_1$ of the average value calculator circuit 12 and similarly into input $I_1$ of the switching circuit 13. The multi-valued image data 14 output from the switching circuit 13 are fed into the other input $I_2$ of the average value calculator circuit 12.

The average value calculator circuit 12 adds together the multi-valued image data 11 and 14 fed into its two inputs $I_1$ and $I_2$, divides these by the numerical value "2" and evaluates the average value for the intensity level of pixels following integration. The multi-valued image data 15 of these pixels following integration are set by the flip-flop circuit 16, and then are fed in the form of multi-valued image data 17 into the input of the FIFO memory (first in, first out memory) 18 and the other input $I_2$ of the switching circuit 13. The multi-valued image data 17 fed into the input $I_2$ of the switching circuit 13 are fed into the average value calculator circuit 12 in order to reintegrate the image data already integrated.

After input into the FIFO memory 18 the multi-valued image data 19 output from here is fed into the binary conversion circuit 21, here in turn binary conversion takes place and binary encoded image data 22 are output. These binary encoded image data 22 are then for example stored in the image memory (not shown) and used in image processing.

This pixel density converter includes a timing generator circuit 24 whose purpose is to regulate the timing of the circuit functions. The base clock 25, magnification rate data 26 and data clock 27 are fed into the timing generator circuit 24. Of these the base clock 25 and the magnification rate data 26 are fed into the multiplier 28, and a clock signal 29 is generated in accordance with the rate of magnification. This clock signal 29 is fed into the No. 1 flip-flop circuit 31, and is input synchronous with the data clock 27. A sawtooth clock signal 32 output from the No. 1 flip-flop circuit 31 is fed into the No. 2 flip-flop circuit 33, and a sawtooth clock signal 34 representing its output is fed into the switching circuit 13 for purposes of switching control. In addition, the sawtooth clock signal 32 output from the No. 1 flip-flop circuit 31 is also fed into the inverter 35, whence a logic-reversed clock signal is fed into the FIFO memory 18 in the form of a read clock 36, used to control the reading of the multi-valued image data 19.

FIGS. 5(a)–5(g) are designed to explain the operational timing of a pixel density converter constructed in this way. The functions of the pixel density converter in the first example of implementation shall be explained in conjunction with these figures.

In advance of the start of the conversion function of this pixel density converter, the magnification rate data 26 are fed into the multiplier 28 inside the timing generator circuit 24 shown in FIG. 4. These magnification rate data 26, which express the linear rate of magnification, can be shown as a ratio of the number of pixels in the multi-valued image data 11 included in one line, as against the number of binary-encoded image data 22. In the present example of implementation a case of reduction to 25 percent is explained as an example. In this case, 4-pixel segments of multi-valued image data 11 are integrated into single pixels of binary-encoded image data 22. Thus, the multiplier 28 generates a sawtooth clock signal 29 (FIG. 5a) at a ratio such that the H (high) level phase of the base clock 25 takes up 25 percent of its total.

The sawtooth clock signal 29 is fed into the No. 1 flip-flop circuit 31, and is set according to the oscillations of the data clock 27 (FIG. 5b). The base clock 25 explained above is in a relationship of having a frequency that is one-half b ($\frac{1}{2}$) frequency of the data clock 27. In this way, a sawtooth clock signal 32 (FIG. 5c) is output from the No. 1 flip-flop circuit 31, while sawtooth clock signal 34 (FIG. 5d) is output from the No. 2 flip-flop circuit 33. This sawtooth clock signal 34 is fed into the switching circuit 13. As this sawtooth clock signal 34 reaches its H level phase the switching circuit 13 selects its input $I_1$, while it selects the other input $I_2$ at the L (low) level phase.

When the conversion function of this pixel density converter is started, multi-valued image data 11 (FIG. 5e) is fed through from the reading device (not shown). These multi-valued image data 11, synchronous with the data clock 27, are fed pixel by pixel into both input $I_1$ of the average value calculator circuit 12 and input $I_1$ of the switching circuit 13.

Now, at the first H level phase of the sawtooth clock signal 34 the pixel of the multi-valued image data 11 is given the number "1". As soon as the multi-valued image data 11 of this first pixel has been fed into input $I_1$ of the average value calculator circuit 12, the switching circuit 13 selects its input $I_1$. Thus, the multi-valued image data 11 of this first pixel are input into the average value calculator circuit 12 via both its inputs $I_1$ and $I_2$, and the average value of these two is determined. This average value is fed into the flip-flop circuit 16 in the form of multi-valued image data 15.

The data clock 27 shown at FIG. 5b is fed into the clock input terminal of the flip-flop circuit 16. There, the average value of these first pixel data is set synchronous with the data clock 27. This leads to the output of multi-valued image data 17 (FIG. 5f) which represent this average value.

Meanwhile, the sawtooth clock signal 32 shown at FIG. 5c is logic-reversed by the inverter 35, and becomes the read clock 36 (FIG. 5g). When this read clock 36 is at H level the FIFO memory 18 does not input data. Therefore, the multi-valued image data 17 which represent the average value of the first pixel data are not input into the FIFO memory 18, being fed only into the switching circuit 13.

At this point, the sawtooth clock signal 34 fed into the switching circuit 13 has changed to L level. Consequently, in this state the multi-valued image data 17 representing the average value of the first pixel data and the multi-valued image data 11 of the second pixel are input into the average value calculator circuit 12, where the average value is determined. The multi-valued image data 15 which represent this average value are set by the flip-flop circuit 16 and are output in the form of multi-valued image data 17; they, similarly, are not input into the FIFO memory 18 but are only fed into the switching circuit 13. In the same way, the multi-valued image data 17 which represent the average value of the first and second pixels are input into the average value calculator circuit 12 together with the multi-valued image data 11 of the third pixel, and the average value is determined. Following on similarly, at the next timing interval the multi-valued image data 17 which represent the average value of pixels 1 to 3 are input into the average value calculator circuit 12 together with the multi-valued image data 11 of the fourth pixel, and the average value is determined.

When the multi-valued image data 11 of the fourth pixel has been added and the average value determined, the read clock 36 reaches L level. Accordingly, at this point the FIFO memory 18 receives the intensity level of the pixel integrated from these four pixels in the form of multi-valued image data 17. Following on similarly, image processing of single pixels integrated from each group of four pixels is carried out, and multi-valued image data 17 comprising reduced numbers of pixels are successively stored in the FIFO memory 18. A clock signal (not shown) is fed from the read side into the FIFO memory 18, multi-valued image data 19 is read in sequence of input pixels, and after conversion to binary notation in the binary conversion circuit 21 using a fixed threshold value, output is made in the form of binary encoded image data 22.

Figure 6A:
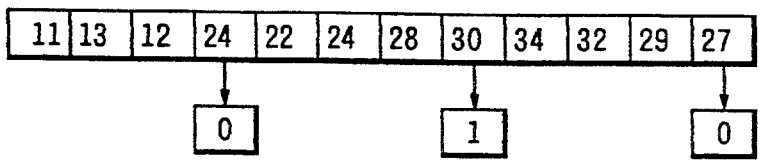
FIGS. 6(a) to 6(c) are explanatory diagrams showing specific situations of data processing by, respectively, two conventional devices and by the device in the first example of implementation.
Figure 6B:
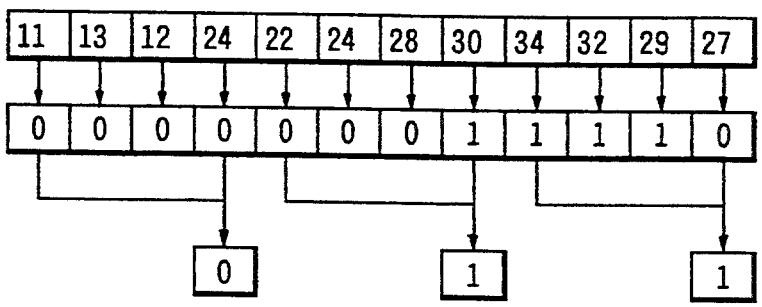
Figure 6C:
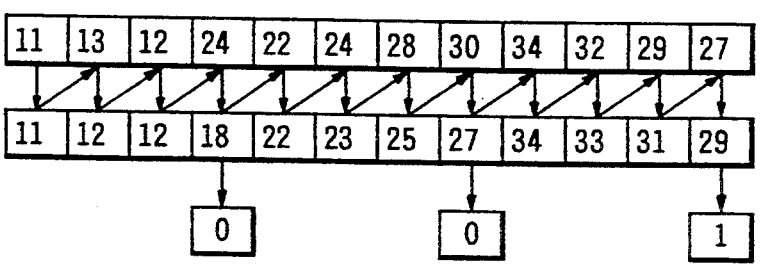

FIGS. 6(a)–6(c) show a specific comparison of processing by the pixel density converter in this first example of implementation with that of a conventional device. In the example shown in FIGS. 6(a)–6(c) the original multi-valued image data 11 are shown in 36 stages, using a case of reduction to 25 percent and a threshold value of "28" for conversion to binary notation.

Part (a) of the diagram is a case of simple thinning out. The multi-valued image data of the last pixel in each group of four is extracted, then binary conversion is carried out on these.

Part (b) of the diagram is a case of logic totalling following conversion to binary notation. In this case, the multi-valued image data of each pixel are converted to binary notation, then a logic total is taken for the binary encoded image data for each group of pixels.

Part (c) of the diagram shows the process of the present example of implementation. An operation to find the average value is repeated in each group of 4 pixels, the final average value being then converted to binary notation.

2nd Example of Implementation

Figure 7:
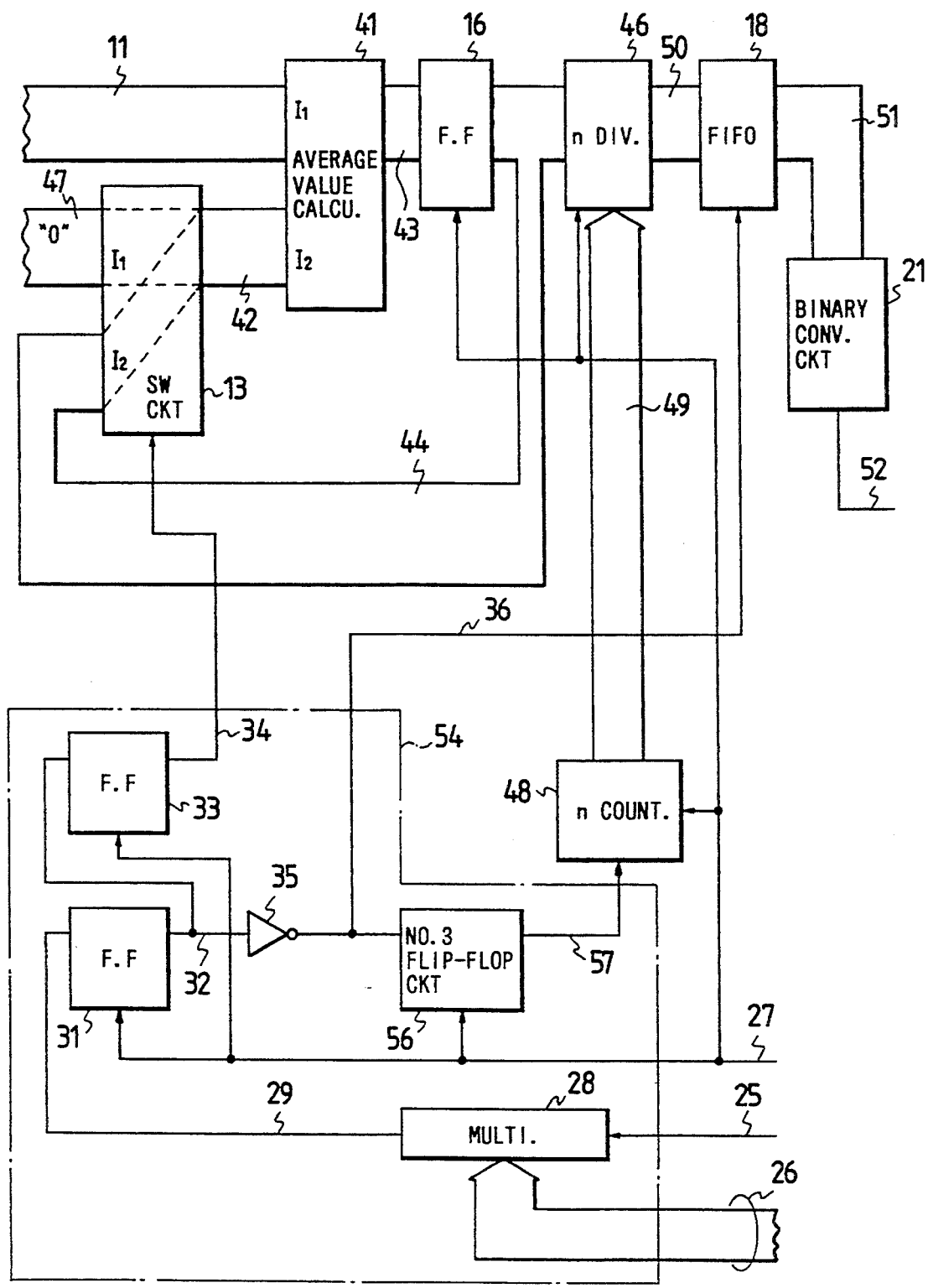
FIG. 7 is a block diagram showing the main features of the circuit structure of a pixel density converter according to a second example of implementation of the invention.

FIG. 7 shows the structure of the pixel density converter used in the second example of implementation of the present invention. This example of implementation embodies the modifications of the invention detailed in the second above-described principle. Since parts common with FIG. 4 are given identical key codes, explanations of these will be abbreviated where appropriate.

In the device shown in FIG. 7, after A/D conversion from the reading device (not shown), multi-valued image data 11 which have undergone shading correction are fed into one input $I_1$ of the counting circuit 41. The counting circuit 41 inputs multi-valued image data 42 output from the switching circuit 13 into its other input $I_2$, and adds these together. The multi-valued image data 43 output from the counting circuit 41 are fed into the flip-flop circuit 16. The multi-valued image data 44 output from the flip-flop circuit 16, as well as being fed into the n-divider 46 are also fed into input $I_2$ of the switching circuit 13. The all-zero initial signal 47 is fed into the other input $I_1$ of the said switching circuit 13.

The n-divider 46 accepts the multi-valued image data 44 when the flip-flop circuit 16 has reached a fixed total, and divides this by n, the number of pixels totalled so far. The n-counter 48 is attached in order to evaluate this number n, and the data 49 output from here are fed into the n-divider 46. The multi-valued image data 50 thus produced from the n-divider 46 are fed into the FIFO memory 18. The multi-valued image data 51 read from the FIFO memory 18 are fed into the binary conversion circuit 21, here binary conversion is successively carried out, and binary encoded image data 52 are output. These binary encoded image data 52 are then, for example, stored in the image memory (not shown) and used in image processing.

A timing generator circuit 54 is attached to this pixel density converter in order to regulate the timing of the circuit functions. The base clock 25, magnification rate data 26 and data clock 27 are fed into the timing generator circuit 54. Of these, the base clock 25 and the magnification rate data 26 are fed into the multiplier 28, where they generate a sawtooth clock signal 29 according to the rate of magnification. This sawtooth clock signal 29 is fed into the No. 1 flip-flop circuit 31, and is input synchronous with the data clock 27. The sawtooth clock signal 32 output from the No. 1 flip-flop circuit 31 is fed into the No. 2 flip-flop circuit 33, and the sawtooth clock signal 34 which represents its output is fed into the switching circuit 13 for purposes of switching control. In addition, the sawtooth clock signal 32 output from the No. 1 flip-flop circuit 31 is also fed into the inventor 35, whence a logic reversed clock signal is fed into the FIFO memory 18 in the form of a read clock 36, used to control the reading of multi-valued image data 19.

In addition, the read clock 36 is also fed into the No. 3 flip-flop memory 56, where it is counted up and used to evaluate n, the number of pixels for the division process. The clock signal 57 output from the No. 3 flip-flop circuit 56 is fed into the n-counter 48, where it is used to reset the counter to "1".

FIGS. 8(a)–8(i) are designed to explain the operational timing of a pixel density converter constructed in this way. The functions of the pixel density converter in the second example of implementation shall be explained in conjunction with these figures.

In advance of the start of the conversion function of this pixel density converter, the magnification rate data 26 are fed into the multiplier 28 inside the timing generator circuit 24 shown in FIG. 7. These magnification rate data 26 show a linear rate of magnification. In the present example of implementation, a case of reduction to 25 percent is explained as an example. In this case, the multiplier 28 generates a sawtooth clock signal 29 (FIG. 8a) at such a ratio that the H level phase of the base clock 25 takes up 25 percent of its total.

Figure 8:
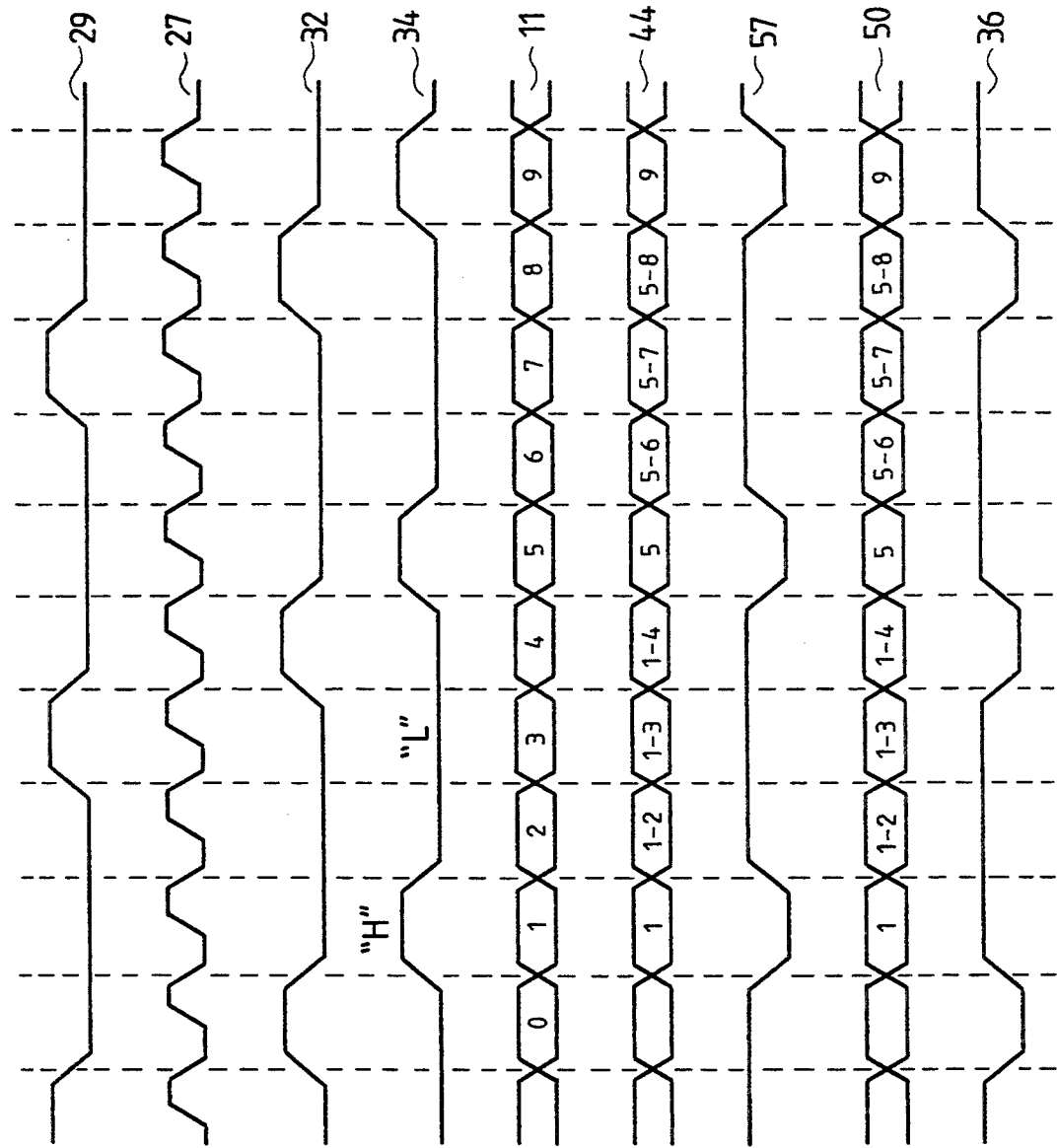
FIGS. 8(a)-8(i) are timing diagrams showing the timings of all parts of this device.

The sawtooth clock signal 29 is fed into the No. 1 flip-flop circuit 31, and is set according to the oscillation of the data clock 27 (FIG. 8b). The base clock 25 explained above has a frequency equal to ½ the frequency of the data clock 27. Thus, a sawtooth clock signal 32 (FIG. 8c) is output from the No. 1 flip-flop circuit 31, while sawtooth clock signal 34 (FIG. 8d) is output from the No. 2 flip-flop circuit 33. This sawtooth clock signal 34 is fed into the switching circuit 13. The switching circuit 13 selects its input $I_1$ when the sawtooth clock signal 34 has reached H level, while with the latter at L (low) level it selects its other input $I_2$.

When the conversion function of this pixel density converter is started, multi-valued image data 11 (FIG. 8e) are fed through from the reading device (not shown). These multi-valued image data 11 are fed one pixel at a time into input $I_1$ of the counting circuit 41, synchronous with the data clock 27.

Now, the pixel of multi-valued image data 11 at the first H level phase of the sawtooth clock signal 34 is given the number "1". As soon as the multi-valued image data 11 of this first pixel have been fed into input $I_1$ of the counting circuit 41, the switching circuit 13 has selected its input $I_1$. Then, the multi-valued image data 11 of this first pixel are input into the counting circuit 41 via input $I_1$, while the all-zero initial signal 47 is input via the other input $I_2$, and these two are added together. The combined value is actually the multi-valued image data 11 of the first pixel. The combined value is input into the flip-flop circuit 16 in the form of multi-valued image data 43.

The data clock 27 shown at FIG. 8b is fed into the clock input terminal of the flip-flop circuit 16. There, the multi-valued image data of this first pixel is set synchronous with the data clock 27. This leads to the output of multi-valued image data 44 (FIG. 8f) which represent the combined value. These multi-valued image data 44 are fed into both the n-divider 46 and the switching circuit 13.

Meanwhile, a clock signal 57 (FIG. 8g) is fed into the reset terminal of the n-counter 48 from the No. 3 flip flop circuit 56, and in this condition data 49 showing the numerical value "1" are fed into the n-divider 46. In consequence, the n-divider 46 divides the multi-valued image data of the first pixel by the numerical value "1", and outputs multi-valued image data 50 (FIG. 8h). These multi-valued image data 50 are fed into the FIFO memory 18.

The read clock 36 (FIG. 8i), wherein the inverter 35 has reversed the sawtooth clock signal 32 shown at FIG. 8c, is fed into the FIFO memory 18. When the said read clock 36 is at H level the FIFO memory 18 does not input data. Therefore, this means that the multi-valued 5 image data 44 which represent the value of the first pixel are not input into the FIFO memory 18, but are only fed into the switching circuit 13.

When the multi-valued image data 44 which represent the value of the first pixel are fed into the switching circuit 13, the sawtooth clock signal 34 has changed to L level. Consequently, in this condition the multi-valued image data 44 which represent the value of the first pixel and the multi-valued image data 11 of the second pixel are fed into the counting circuit 41, and the combined value is determined. The multi-valued image data 43 which represent this combined value are set by the flip-flop circuit 16, are output in the form of multi-valued image data 44 and are fed into the switching circuit 13 and the n-divider 46. Of these, in the n-divider 46 they are divided by the numerical value "2". However, as in the previous case the multi-valued image data 50 resulting from this division are not input into the FIFO memory 18.

The multi-valued image data 44 which represent the combined value of the first and second pixels, which have been fed into the switching circuit 13, are input into the counting circuit 41 where they are added to the multi-valued image data 11 of the third pixel, their total value then being determined. Similarly, at the next timing interval the multi-valued image data 44 which represent the total value of pixels 1 to 3 are input into the counting circuit 41 together with the multi-valued image data 11 of the fourth pixel, and the total value is determined.

At the stage when the multi-valued image data 11 of this fourth pixel have been added and the total value determined, the read clock 36 is at L level. Now, the n-divider 46 feeds the multi-valued image data 50, representing the result of the division of the total value of pixels 1 to 4 by the numerical value "4", into the FIFO memory 18. Consequently, at this point the FIFO memory 18 receives the intensity level of the pixel integrated from these four pixels, in the form of multi-valued image data 50. Similarly, image processing of pixels integrated from each set of four pixels is carried out, and multi-valued image data 50 representing reduced numbers of pixels is successively stored in the FIFO memory 18. A clock signal (not shown) is fed from the read side into the FIFO memory 18, multi-valued image data 51 are read in sequence of input pixels, and after conversion to binary notation in the binary conversion circuit 21 using a fixed threshold value, output is made in the form of binary encoded image data 52.

Figure 9:
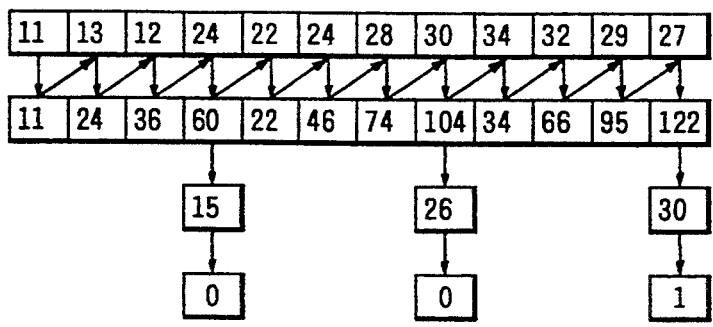
FIG. 9 is an explanatory diagram showing a specific situation of data processing by the device in the second example of implementation.

FIG. 9 shows the process of the pixel density converter in this second example of implementation at specific intensity levels. As shown in this example, when the intensity levels follow in a sequence such as "11", "13", "12", "24", the counting circuit 41 (FIG. 7) first evaluates the combined value "11", then this numerical value is added to the numerical value "13" of the second pixel, producing the combined value "24". Continuing similarly, the total value "60" up to and including the numerical value "24" of the fourth pixel is determined, and by dividing this by "4", the total number of pixels counted, the resulting value "15" becomes the value of the multi-valued image data 50 for the single integrated pixel. This value is then converted to binary notation using a threshold value of "28", producing "0" which becomes the binary encoded image data 52 for this case.

3rd Example of Implementation

Figure 10:
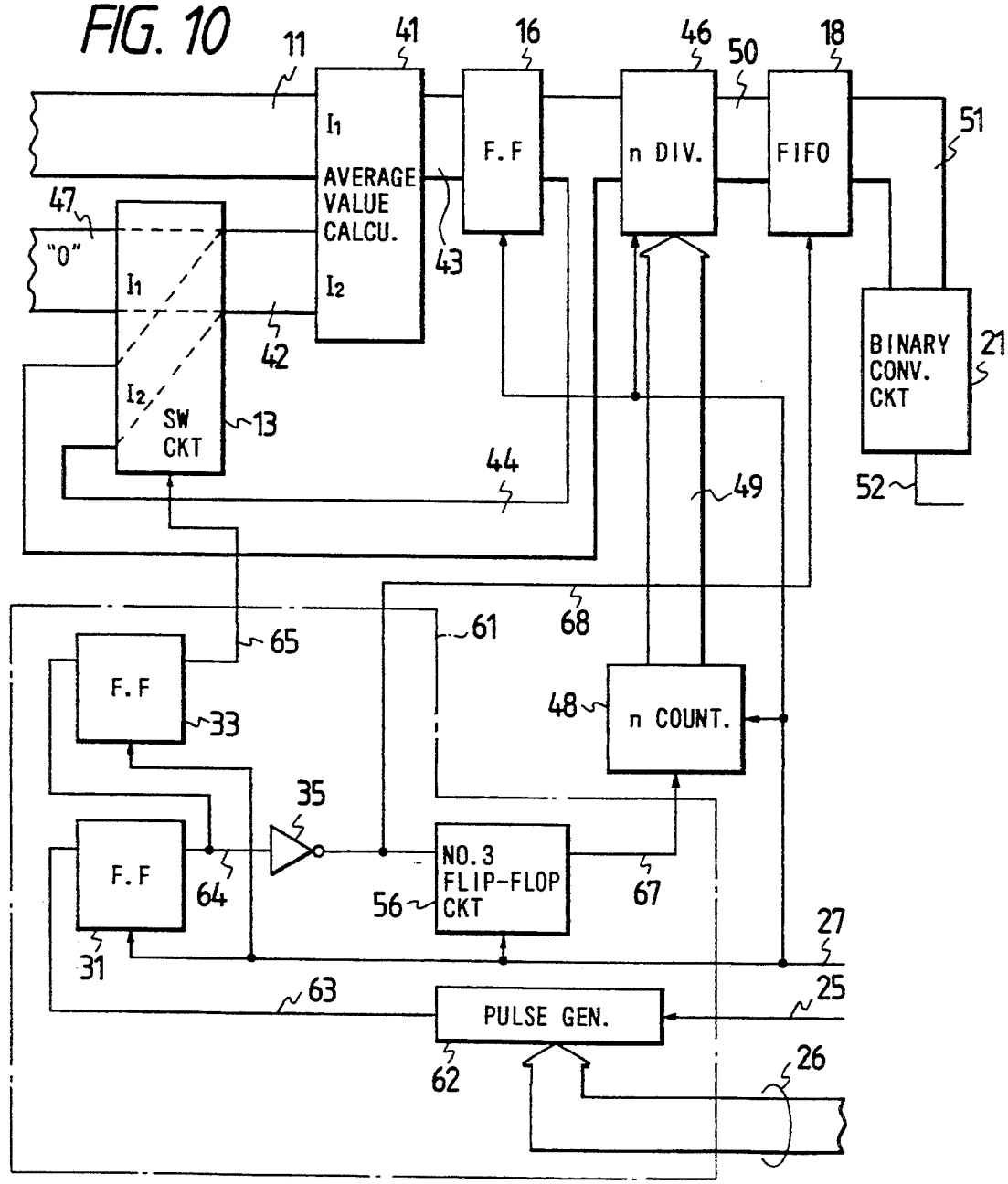
FIG. 10 is a block diagram showing the main features of the circuit structure of a pixel density converter according to a third example of implementation of the invention.

FIG. 10 shows the structure of the pixel density converter used in the third example of implementation of the present invention. This example of implementation embodies the modification of the embodiment of the invention according to the above principle discussed in connection with FIGS. 3(a)–3(c). Since parts common with FIG. 7 are given identical key codes, explanations of these shall be abbreviated where appropriate.

In the device shown in FIG. 10, after A/D conversion from the reading device (not shown), multi-valued image data 11 that has undergone shading correction is fed into one input $I_1$ of the counting circuit 41. The counting circuit 41 inputs multi-valued image data 42 output from the switching circuit 13 via its other input $I_2$, and adds these together. Multi-valued image data 43 output from the counting circuit 41 is fed into the flip-flop circuit 16. Multi-valued image data 44 output from the flip-flop circuit 16, as well as being fed into the n-divider 46, is also fed into input $I_2$ of the switching circuit 13. The all-zero initial signal 47 is fed into the other input $I_1$ of the said switching circuit 13.

The n-divider 46 accepts the multi-valued image data 44 when a fixed total has been reached by the flip-flop circuit 16, then divides this by n, the number of pixels totalled so far. However, unlike in the second example of implementation, in this third example of implementation this totalled number of pixels n is a value generated at random under fixed conditions. In order to calculate this number n, the n counter 48 is attached, and data 49 output from here are fed into the n-divider 46. The multi-valued image data 50 thus produced from the n-divider 46 are fed into the FIFO memory 18. Multi-valued image data 51 read from the FIFO memory 18 are fed into the binary conversion circuit 21, where conversion to binary notation is successively carried out, and binary encoded image data 52 are output. These data are then, for example, stored in the image memory (not shown) and used in image processing. This pixel density converter includes a timing generator circuit 61 which determines the value of the numerical value n and the timing of the circuit functions. The base clock 25, magnification rate data 26 and data clock 27 are fed into the timing generator circuit 61. Of these, the base clock 25 and magnification rate data 26 are fed into the pulse generator 62, and its cycle generates a randomly changing sawtooth clock signal 63 according to the rate of magnification.

In order to generate such a sawtooth clock signal 63, a ROM (Read Only Memory) table is attached to the timing generator circuit 61 for the reading of the sawtooth clock signal 63, determined at random in advance, in accordance with the specified rate of magnification. For example, in a case of reduction to 25 percent, in order to extract one pixel from 4 pixels, a sawtooth clock, whereby one cycle each from groups of 3, 4, and 5 cycles of the base clock 25 are brought to H level, is read in the form of a sawtooth clock signal 63. Alternatively, it is also acceptable to create other configurations such that eg. 3 out of 12 cycles or 4 out of 16 cycles are brought to H level, etc.

The sawtooth clock signal 63 is fed into the No. 1 flip-flop circuit 31 and is input synchronously with the data clock 27. A sawtooth clock signal 64 output from the No. 1 flip-flop circuit 31 is fed into the No. 2 flip-flop circuit 33, from which the output sawtooth clock signal 65 is fed into the switching circuit 13 for purposes of switching control. In addition, the sawtooth clock signal 64 output from the No. 1 flip-flop circuit 31 is fed into the inverter 35, whence a logic-reversed clock signal is fed into the FIFO memory 18 in the form of a read clock 68 and used to control the reading of multi-valued image data 19.

In addition, the read clock 68 is also fed into the No. 3 flip-flop circuit 56, where it is counted up and used for determining n, the number of pixels for the division process. The clock signal 67 output from the No. 3 flip-flop circuit 56 is fed into the n-counter 48, and is used for resetting the counter value to "1".

FIGS. 11(a)–11(i) are designed to explain the operational timing of a pixel density converter constructed in this way. The functions of the pixel density converter in the third example of implementation shall be explained in conjunction with these figures.

In advance of the start of the conversion function of this pixel density converter, the magnification rate data 26 are fed into the pulse generator 62 inside the timing generator circuit 24 shown in FIG. 10. These magnification rate data 26 express a linear rate of magnification. In the present example of implementation a case of reduction to 25 percent is explained as an example. In this case, the pulse generator 62 generates a sawtooth clock signal 63 (FIG. 11a), as described above, at a ratio such that the H level phase of the base clock 25 takes up 25 percent of its total.

Figure 11:
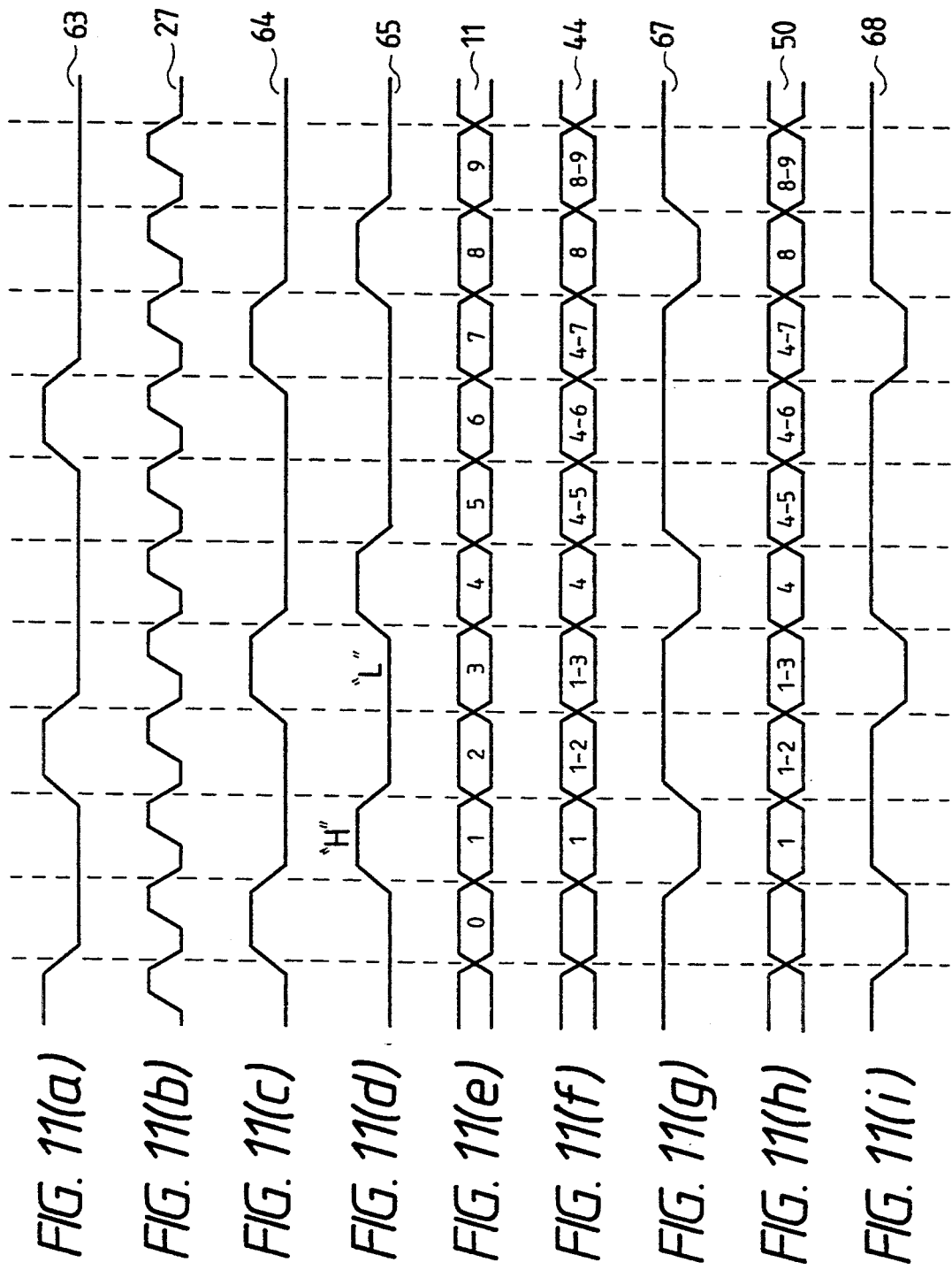
FIGS. 11(a)-11(i) are timing diagrams showing the timings of all parts of this device.

The sawtooth clock signal 63 is fed into the No. 1 flip-flop circuit 31, and is set in accordance with the oscillation of the data clock 27 (FIG. 11b). The base clock 25 as explained above has a frequency of ½ the frequency of the data clock 27. Thus, the sawtooth clock signal 64 (FIG. 11c) is output from the No. 1 flip-flop circuit 31, while a sawtooth clock signal 65 (FIG. 11d) is output from the No. 2 flip-flop circuit 33. This sawtooth clock signal 65 is fed into the switching circuit 13. The switching circuit 13 selects input $I_1$ when this sawtooth clock signal 65 is at H level phase, while at L (low) level phase it selects its other input $I_2$.

When the conversion function of this pixel density converter is started, multi-valued image data 11 (FIG. 11e) are fed through from the reading device (not shown). These multi-valued image data 11, synchronous with the data clock 27, are fed one pixel at a time into input $I_1$ of the counting circuit 41.

Now, the pixel of multi-valued image data 11 at the initial H level phase of the sawtooth clock signal 65 is given the number "1". As soon as the multi-valued image data 11 of this first pixel are fed into input $I_1$ of the counting circuit 41, the switching circuit 13 has selected its input $I_1$. Thus, the multi-valued image data 11 of this first pixel are input into the counting circuit 41 via input $I_1$, while the all-zero initial signal 47 is input via the other input $I_2$, and the two are added together. This combined value is actually the multi-valued image data 11 of the first pixel. The combined value is fed into the flip-flop circuit 16 in the form of multi-valued image data 43.

The data clock 27 shown at FIG. 11b is fed into the clock input terminal of the flip-flop circuit 16. There, the multi-valued image data of this first pixel are set synchronous with the data clock 27. This leads to the output of multi-valued image data 44 (FIG. 11f) representing the combined value. These multi-valued image data 44 are fed into both the n-divider 46 and the switching circuit 13.

Meanwhile, a clock signal 67 (FIG. 11g) is fed into the reset terminal of the n-counter 48 from the No. 3 flip-flop circuit 56, and in this condition data 49 representing the numerical value "1" are fed into the n-divider 46. Consequently, the n-divider 46 divides the multi-valued image data of the first pixel by the numerical value "1", and outputs multi-valued image data 50 (FIG. 11h). These multi-valued image data 50 are fed into the FIFO memory 18.

A read clock 68 (FIG. 11i), resulting from reversal of the sawtooth clock signal 64 shown at FIG. 11c by the inverter 35, is fed into the said FIFO memory 18. When this read clock 68 is at H level the FIFO memory 18 does not input data. As a result, the multi-valued image data 44 which represent the value of the first pixel are not input into the FIFO memory 18, but are fed only into the switching circuit 13.

When the multi-valued image data 44 which represent the value of the first pixel are fed into the switching circuit 13, the sawtooth clock signal 65 changes to L level. Thus, in this condition the multi-valued image data 44 which represent the value of the first pixel are input into the counting circuit 41 together with the multi-valued image data 11 of the second pixel, and the combined value is determined. The multi-valued image data 43 which represent this combined value are set by the flip-flop circuit 16, whence they are output in the form of multi-valued image data 44 and fed into the switching circuit 13 and the n-divider 46. Of these, in the n-divider 46 they are divided by the numerical value "2". However, as in the previous case the multi-valued image data 50 resulting from this division are not input into the FIFO memory 18.

The multi-valued image data 44 which represent the combined value of the first and second pixels fed into the switching circuit 13 are input into the counting circuit 41, where they are added to the multi-valued image data 11 of the third pixel, and the total value of these is determined. At the stage where the multi-valued image data 11 of the third pixel has been added and the total value determined, the read clock 68 is at L level. At this time the multi-valued image data 50 which represent the result of the division of the total value of pixels 1 to 3 by the numerical value "3" are fed into the FIFO memory 18 by the n-divider 46. Consequently, at this point the FIFO memory 18 accepts the intensity level of the pixel integrated from these 3 pixels, in the form of multi-valued image data 50.

In the first step explained above the sawtooth clock signal 63 has generated 1 cycle for every 3 cycles of the data clock 27. As a result, multi-valued image data 50 of a single pixel has been produced from the multi-valued image data 11 of pixels 1 to 3. In the next step the sawtooth clock signal 63 generates 1 cycle for every 4 cycles of the data clock 27. Consequently, multi-valued image data 50 of a single pixel are produced from the multi-valued image data 11 of pixels 4 to 7. Again, in the following step the sawtooth clock signal 63 generates 1 cycle for every 5 cycles of the data clock 27. As a result multi-valued image data 50 of a single pixel are produced from the multi-valued image data 11 of pixels 8 to 12.

Similarly, the multi-valued image data 50 of 3 pixels taken from the multi-valued image data 11 of a total of 12 pixels are successively taken up by the FIFO memory 18. A clock signal (not shown) is fed into the FIFO memory 18 from the read side, multi-valued image data 51 are read in sequence of input pixels, and after conversion to binary notation in the binary conversion circuit 21 using a fixed threshold value, output is made in the form of binary encoded image data 52.

Figure 12:
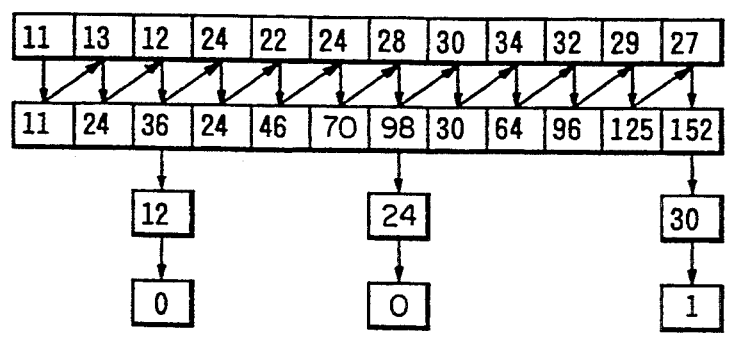
FIG. 12 is an explanatory diagram showing a specific situation of data processing by the device in the third example of implementation.
Figure 13A:
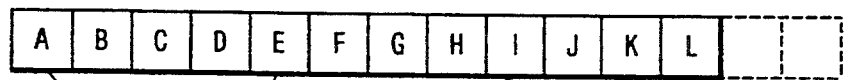
FIGS. 13(a)-13(c) are explanatory diagrams showing the principle of data processing by a conventional device using the simple thinning-out methods.
Figure 13B:
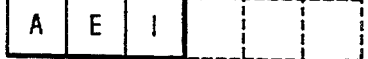
Figure 13C:
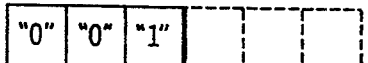
Figure 14A:
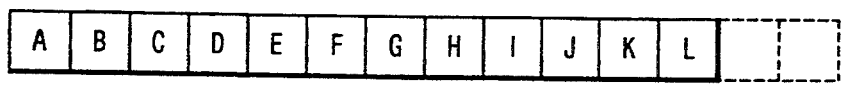
FIGS. 14(a)-14(c) are explanatory diagrams showing the principle of data processing by a device using the conventional means for taking logic totals after conversion to binary notation.
Figure 14B:
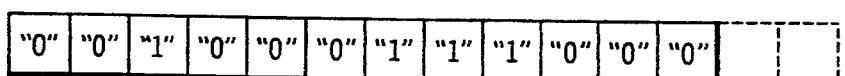
Figure 14C:
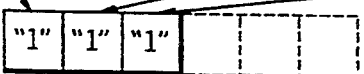

FIG. 12 shows the process of the pixel density converter in this third example of implementation at specific intensity levels. As shown in this example, after dividing off groups of 3, 4, and 5 pixels respectively, the respective total values are determined as "36", "98", and "152". Then, these are divided by the respective numbers of pixels, viz. "3", "4", and "5", to produce the numerical values "12", "24", and "30" which represent the multi-valued levels of the pixels after integration. When these are individually converted to binary notation using a threshold value of "28", the data "0," "0", and "1" are produced as the respective binary encoded data 52.

As explained above, the invention described in the first implementation presents a means for pixel integration whereby, after adding together multi-valued data representing the respective intensity levels of 2 adjacent pixels and then dividing this by two, the intensity level of a single integrated pixel is produced; then by successively repeating the integration process of this means for pixel integration, and converting the respective intensity levels of the final integrated pixels to binary notation using a fixed threshold value, output is made in the form of a row of pixels following a reduction in the number of pixels. As a result, since binary conversion takes place on the basis of data that sufficiently reflect the intensity level of each pixel, even, for example, in a case such as that of a binary-encoded image following reduction of a diagonal line image, an image which maintains good lineality can be produced, and deterioration in image quality can be kept to a minimum.

In addition, the invention described in the second implementation presents a means for pixel integration whereby, after adding together multi-valued data which represent the respective intensity levels of a successive fixed number of pixels, and then dividing by this same fixed number, the intensity level of a single integrated pixel is produced; conversion to binary notation using a fixed threshold value is then carried out on the respective intensity levels of the pixels produced as a result of successive integration in accordance with the above means for pixel integration. In this way it is possible, similarly, to carry out a process of conversion to binary notation which faithfully reflects the respective intensity levels of individual pixels.

The invention detailed in the third implementation presents a means for pixel integration whereby, after adding together multi-valued data which represent the respective intensity levels of a successive fixed number of pixels, and then dividing by this same fixed number, the intensity level of a single integrated pixel is produced; and a means for specifying the fixed number, whereby each time pixel integration occurs in accordance with the above means for pixel integration, the aforementioned fixed number changes individually such that the total of numbers in a given sequence reaches a required value. Following integration in accordance with the means for pixel integration, the resulting intensity levels of the respective pixels are converted to binary notation using a threshold value, and output is made in the form of a row of pixels following a reduction in the number of pixels. As a result, since it is hereby possible to alter the range within which integration into a single pixel may be carried out, as against cases where this range is fixed, the occurrence of moire phenomena, caused by interference between pixels in a reconstituted image, can be reduced.

Additional advantages and modifications will readily occur to those skilled in the art. Therefore, the invention in its broader aspects is not limited to the specific details, representative devices, and illustrative examples shown and described. Accordingly, departures may be made from such details without departing from the spirit or scope of the general inventive concept as defined by the appended claims and their equivalents.

We claim:

1. An electrical signal converter comprising:
   means responsive to an electrical signal sequentially representing pixels of an image read by an image sensor for combining multi-valued data representing the respective intensity levels of a first temporarily fixed number of pixels to yield a set of successive electrical signals each representing the intensity level of a single integrated pixel;

means responsive to the combining means for sequentially changing the first temporarily fixed number as applicable in the combining means a plurality of times to provide a sequence of first, second and third temporarily fixed numbers to satisfy the condition that the total of the values of the temporarily fixed numbers in the sequence reaches a required value, the values of the temporarily fixed numbers being otherwise not constrained; and means for converting by binary conversion each of the set of successive electrical signals to a binary notation in which each represented intensity value is compared to a fixed threshold value and the difference is represented to yield a resultant electrical signal sequentially representing pixels of a data-reduced image, which resultant electrical signal is transmitted to an image reproduction device.

* * * * *